United States Patent [19]

Hall

[11] Patent Number: 5,720,071
[45] Date of Patent: Feb. 24, 1998

[54] COOKING GRATE CLEANING IMPLEMENT

[76] Inventor: Daniel L. Hall, 12860 Lever St. NE., Blaine, Minn. 55432

[21] Appl. No.: 627,245

[22] Filed: Apr. 1, 1996

[51] Int. Cl.⁶ .................................................. A47L 13/02
[52] U.S. Cl. ...................... 15/236.08; 15/142; 15/143.1; 15/236.06; 30/172; 30/304; 172/378
[58] Field of Search ........................... 15/142, 143.1, 15/236.01, 236.05–236.09; 30/169, 171, 172, 304, 305, 318, 320; 172/371, 372, 378; 56/400.18, 400.19, 400.21

[56] References Cited

U.S. PATENT DOCUMENTS

| | | | |
|---|---|---|---|
| 608,337 | 8/1898 | Merkle | 30/304 |
| 718,571 | 1/1903 | Hoodless | 172/378 X |
| 719,723 | 2/1903 | Beebe | 172/378 X |
| 878,293 | 2/1908 | Kadan | 30/304 X |
| 1,309,228 | 7/1919 | Tellin | 172/378 X |
| 1,936,757 | 11/1933 | Garvey . | |
| 2,172,479 | 9/1939 | McMillen | 15/220.3 |
| 2,824,323 | 2/1958 | Tos et al. | 15/105 |
| 4,056,863 | 11/1977 | Gunjian | 15/160 |
| 4,146,943 | 4/1979 | Wertheimer et al. | 15/111 |
| 4,229,032 | 10/1980 | Murphy | 15/236.06 X |
| 4,910,827 | 3/1990 | Tandberg et al. | 15/236.06 |
| 5,255,406 | 10/1993 | Rood | 15/236.06 |
| 5,319,824 | 6/1994 | Cook, III | 15/160 |
| 5,412,829 | 5/1995 | Hefner | 15/52.1 |
| 5,452,553 | 9/1995 | Cary | 15/143.1 X |

FOREIGN PATENT DOCUMENTS

| | | | |
|---|---|---|---|
| 326190 | 5/1903 | France | 172/378 |
| 880807 | 6/1953 | Germany | 172/378 |

*Primary Examiner*—Mark Spisich
*Attorney, Agent, or Firm*—Nawrocki, Rooney & Sivertson, P.A.

[57] ABSTRACT

An implement for cleaning cooking grates. The cleaning implement has an elongated handle and a head including teeth. The teeth are adjustably secured to, and spaced laterally along, the head so as to fit in between the staves of a cooking grate. The teeth are laterally movable so as to be adjustable to a particular cooking grate. A preferred embodiment has a slot to provide for lateral movement of the teeth. One embodiment envisions use of tapered teeth for contacting the grate staves along a tapered region. One embodiment employs an ergonomic handle allowing for cleaning with only a horizontal back and forth motion.

9 Claims, 2 Drawing Sheets

COOKING GRATE CLEANING IMPLEMENT

TECHNICAL FIELD

The general field of the invention is implements for cleaning cooking surfaces. More specifically, the invention relates to devices for cleaning cooking grates.

BACKGROUND OF THE INVENTION

Cooking grill and broiler grates are commonly used in restaurants, hospitals, and institutional food service facilities. Such grates consist of a plurality of staves having generally parallel sides. Food residue including grease and burnt food becomes attached to, and lodged between, the staves. Grates require frequent cleaning to remove such food residues.

Prior art devices exist for cleaning cooking grates. Typically, wire brushes are used for such cleaning. Wire brushes used for this purpose usually have very stiff wire bristles to bring more than minimal force to bear against the cooking grate staves. Such brushes are typically incapable of cleaning well between the grate staves. Such brushes also become quite dirty and hard to clean themselves, having grease, burnt food, and food residue lodged in between the bristles.

Prior art devices have several drawback including lack of adaptability to different grate configurations and the inability to bring more than minimal force to bear against the cooking grate stave tops and sides.

SUMMARY OF THE INVENTION

The present invention takes the general appearance of a rake and includes a plurality of laterally spaced tapered teeth. A head, which mounts the teeth, is provided with a slot which extends generally parallel to an axis of elongation of the head. The teeth are mounted within the slot by an appropriate nut, bolt, and/or washer, or other appropriate mounting means. The teeth, when loosened, are able to float along the slot so as to uniquely fit between adjacent staves of a grate to be cleaned. In this way, teeth positions may be adjusted to fit grates having differing configurations and sizes of staves.

The head of the implement may be of many configurations. In a preferred embodiment of the invention, however, the head is a metal plate.

In a preferred embodiment of the invention, proximal ends of the teeth are wider than spaces between adjacent staves, tapering towards the distal ends, which are narrower than the spaces between the staves. This configuration allows distal ends of the teeth to penetrate the space between the staves, causing the teeth to contact the staves in the tapering region of the teeth. Thus, a tooth contacts each of adjacent staves on either side and generally fills the space in between.

The teeth can be made of mild steel. Consequently, the teeth can wear over time to fit a particular grill.

In a preferred embodiment, the device has an ergonomically beneficial handle attached to the head. The handle is shaped such that an applied generally horizontal back and forth motion is sufficient to clean the cooking grates. The handle is shaped and dimensioned so that, when used properly, downward pressure can be easily brought to bear on the cooking grate staves, such downward pressure being brought to bear through gravity and the weight of the head.

Many head/handle attachment means are contemplated. In a preferred embodiment of the invention, however, the handle is attached to the head using bolts.

DETAILED DESCRIPTION OF THE DRAWINGS

Figure 1:
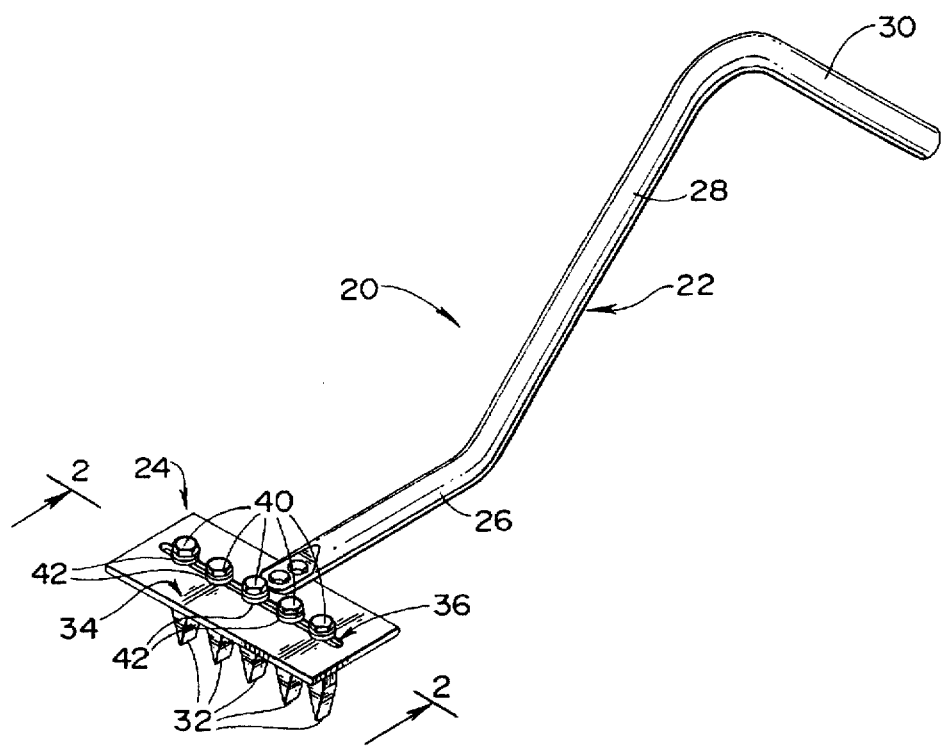
FIG. 1 is a perspective view from the top, side, and front, showing a cooking grate cleaner in accordance with the present invention.

FIG. 1 illustrates an embodiment of a grate cleaner 20 having a handle 22 attached to a head 24, wherein head 24 includes a plate 34, handle 22 being attached to plate 34 using a plurality of handle bolts 44. Plate 34 includes a slot 36 having, when the cleaner 20 is in use, an orientation transverse to the cooking grate staves to be cleaned (not shown). Slot 36 effects mounting of a plurality of teeth 32. Teeth 32 are shown attached to plate 34 using a plurality of bolts 40 and washers 42.

Handle 22 includes a distal portion 26 contiguous with a middle portion 28, which is, in turn, contiguous with a proximal portion 30.

Figure 2:
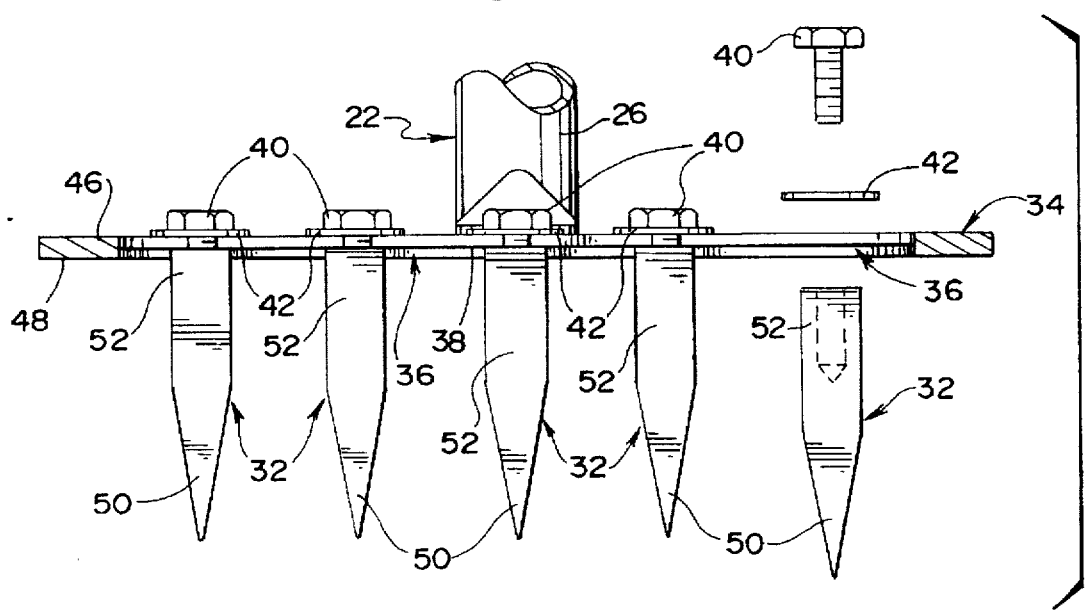
FIG. 2 is a front sectional view taken generally along line 2—2 of FIG. 1 showing the cooking grate cleaner of FIG. 1.

FIG. 2 illustrates head 24 including plate 34, having an upper surface 46 and a lower surface 48, with slot 36 open therebetween. Teeth 32 are shown attached to plate 34 using bolts 40 and washers 42. The insertion of bolt 40 through washer 42 and slot 36 allowing for lateral movement is shown.

Slot 36 is shown having a slot surface 38, with teeth 32 shown penetrating slot 36 and abutting slot surface 38 at a proximal end 52. The embodiment illustrated shows each tooth 32 having a distal tip 50.

Figure 3:
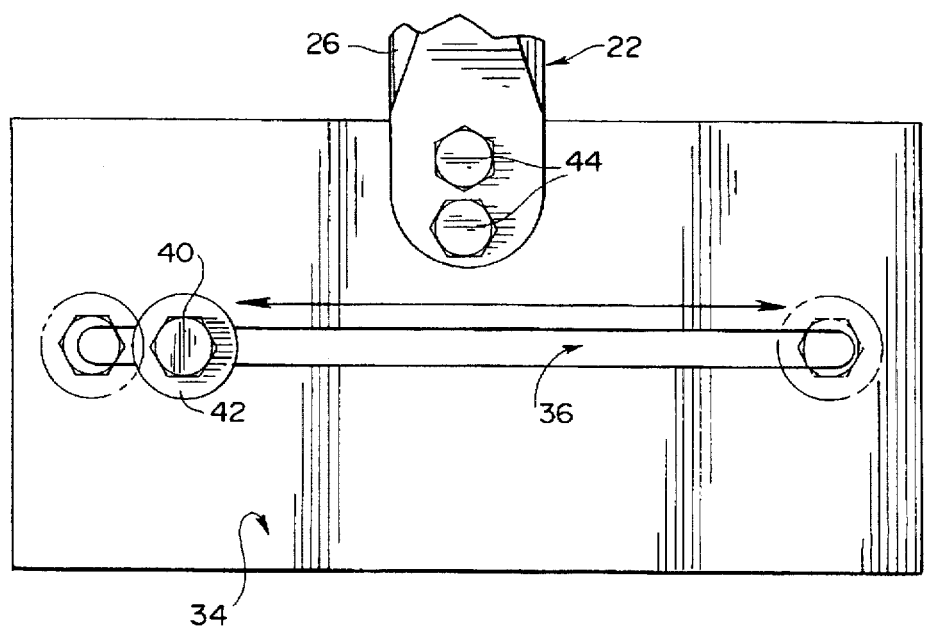
FIG. 3 is a top view of the grate cleaner head of the present invention.
Figure 4:
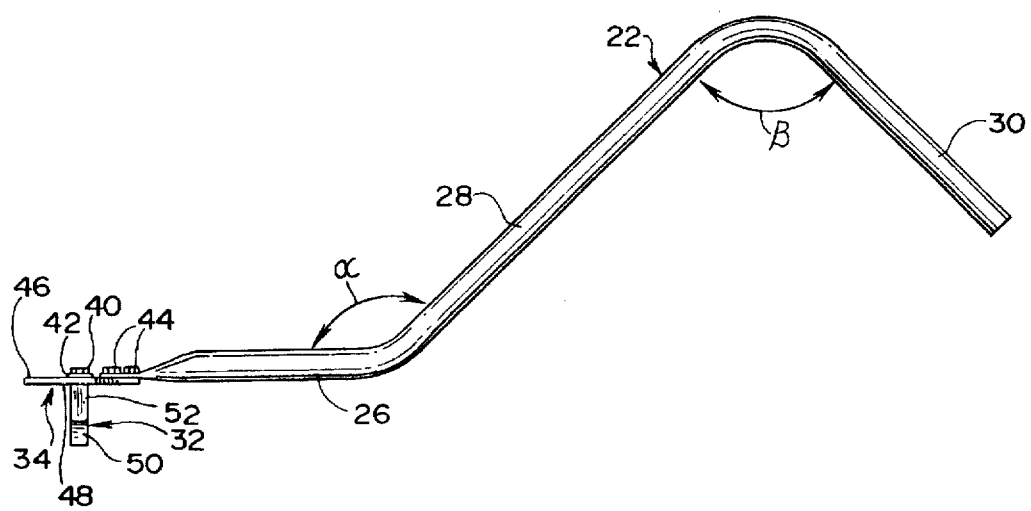
FIG. 4 is a side view of the grate cleaner according to the present invention.

FIG. 3 illustrates one embodiment attaching handle 22 to plate 34 using handle bolts 44, and FIG. 4 illustrates a handle 22 according to the present invention. Handle 22 is shown attached to plate 34 using handle bolts 44. In this particular embodiment, handle distal portion 26 is attached to head plate 34 at a distal end of distal portion 26 generally parallel to head plate 34. Distal portion 26 is attached, at a proximal end thereof, to handle middle portion 28 at a first angle α. Handle middle portion 28 is attached to handle proximal portion 30 at a second angle β.

The particular embodiment illustrated shows one ergonomic design, which allows facile back and forth movement of cleaner 20 with handle portion 30 at a height above that of head 24. It is envisioned that angle α will be within a range of between 110 degrees to 170 degrees, and angle β will be within a range of between 60 degrees to 160 degrees. Optimally, angle α is approximately 135 degrees, and angle β is approximately 90 degrees. A handle having a greater or lesser number of portions and angles is contemplated within the scope of the broad invention.

Because of the construction of the handle portions 26, 28, 30 and the angles formed relative thereto, leverage can be obtained by the user of the implement 20 to disengage the implement 20 if the teeth 32 become tightly wedged within spaces formed between adjacent grate staves. As best seen in FIG. 4, proximal handle portion 30 does not extend downwardly to a plane defined by head plate 34 and handle distal portion 26. Consequently, should teeth 32 become wedged between staves, the operator of the implement 20 can exert downward pressure upon handle proximal portion 30, and the intersection between distal portion 26 and middle portion 28 will engage one or more grate staves and act as a fulcrum for the lever action.

Numerous characteristics and advantages of the invention covered by this document have been set forth in the foregoing description. It will be understood, however, that this disclosure is, in many respects, only illustrative. Changes may be made in details, particularly in matters of shape, size, and arrangement of parts without exceeding the scope of the invention. The invention's scope is, of course, defined in the language in which the appended claims are expressed.

What is claimed is:

1. A cooking grate cleaning implement for use in cleaning the staves and the spaces between staves of different cooking grates, comprising:
   a metal plate head defining an axis orientable generally transverse to the staves to be cleaned, said head including at least one slot oriented along said axis for mounting a plurality of teeth for variable positioning therealong;
   said plurality of teeth carried by said head, each of said teeth being sized and shaped to penetrate a space between adjacent staves and engage the adjacent staves defining the space, said teeth having a maximum width, proximate said head, greater than the space between the staves to be cleaned, a distal width smaller than the space between the staves to be cleaned, and side edges tapering from said maximum width to said distal width, whereby said teeth contact the staves along said taper;
   said teeth being adjustably positionable along said axis; and
   a handle having an end, distal with respect to a user of the implement, attached to said head, said handle comprising a distal portion attached to said head, a middle portion attached to said distal portion, and a proximal portion attached to said middle portion, said distal portion lying generally in the same plane as the head, said middle portion being angled with respect to said distal portion whereby said middle portion rises in a direction away from the cooking grate, and said proximal portion being angled with respect to said middle portion whereby said proximal portion angles downwardly.

2. The cooking grate cleaning implement of claim 1, wherein said teeth are constructed of mild steel such that said teeth wear to the shape of the cooking grate being cleaned.

3. The cooking grate cleaning implement of claim 2, wherein said slot includes a slot surface engaged by a proximal end of each of said teeth.

4. The cooking grate cleaning implement of claim 1, wherein said handle middle portion forms a first angle in the range of 110 degrees to 170 degrees relative to said distal portion, and said proximal portion forms a second angle in the range of 60 degrees to 160 degrees relative to said middle portion.

5. The cooking grate cleaning implement of claim 4, wherein said first angle is approximately 135 degrees and said second angle is approximately 90 degrees.

6. The cooking grate cleaning implement of claim 1, wherein each of said teeth has a proximal portion, with a substantially constant width, said width of said proximal portion being larger than a space between the staves to be cleaned, and wherein each of said teeth has a downwardly and inwardly tapered distal portion, whereby said teeth contact the staves along said tapered distal portions.

7. The cooking grate cleaning implement of claim 6, wherein said teeth are constructed of mild steel such that said teeth wear to the shape of the cooking grate to be cleaned.

8. An adjustable cooking grate cleaning implement for use in cleaning staves of a variety of cooking grates and spaces between the staves, comprising:
   a metal plate head;
   a handle;
   said head having an upper and a lower surface;
   said head defining an axis orientable transverse to the staves to be cleaned;
   said head including a slot therethrough, said slot extending generally parallel to said axis;
   said head having a plurality of teeth, each having a proximal end for attachment to said head, and a distal end for penetration into spaces between the staves of the cooking grate;
   each of said teeth being spaced from other teeth along said axis and adjustably secured to said head at said proximal end thereof using a bolt;
   said teeth having a length sufficient to penetrate between the staves;
   said teeth have a maximal width greater than a space between the staves to be cleaned, a taper, and a distal width smaller than the space between the staves to be cleaned, whereby said teeth contact the staves along said taper;
   said teeth being constructed of mild steel such that said teeth wear to the shape of the cooking grate being cleaned;
   said handle having a distal portion securely attached to said head and having a generally perpendicular orientation to said axis;
   said handle further comprising a middle portion attached to said distal portion, and a proximal portion attached to said middle portion, said distal portion lying in generally the same plane as the head;
   said handle middle portion defining a first angle in the range of approximately 120 degrees to approximately 160 degrees relative to said distal portion, whereby said middle portion rises upwardly from the cooking grate; and
   said proximal portion defining a second angle in the range of approximately 70 degrees to approximately 150 degrees relative to said middle portion, whereby said proximal portion angles downwardly toward said cooking grate.

9. A cooking grate cleaning implement for use in cleaning the staves and the spaces between staves of different cooking grates, comprising:
   a head defining an axis orientable generally transverse to the staves to be cleaned;
   a plurality of teeth carried by said head, each of said teeth being sized and shaped to penetrate a space between adjacent staves and engage the adjacent staves defining the space;
   said teeth being adjustably positionable along said axis; and
   a handle having an end, distal with respect to a user of the implement, attached to said head, said handle comprising a distal portion attached to said head, a middle portion attached to said distal portion, and a proximal portion attached to said middle portion, said distal portion lying generally in the same plane as the head, said middle portion being angled with respect to said distal portion whereby said middle portion rises in a direction away from the cooking grate, and said proximal portion being angled with respect to said middle portion whereby said proximal portion angles downwardly.

* * * * *